United States Patent
Kaheel et al.

(10) Patent No.: US 8,767,081 B2
(45) Date of Patent: Jul. 1, 2014

(54) SHARING VIDEO DATA ASSOCIATED WITH THE SAME EVENT

(75) Inventors: Ayman Malek Kaheel, Cario (EG); Motaz Ahmed El-Saban, Cairo (EG); Mohamed Shawky Abdallah, Cairo (EG); Mahmoud Ahmed Refaat Ali, Cairo (EG)

(73) Assignee: Microsoft Corporation, Redmond, WA (US)

( * ) Notice: Subject to any disclaimer, the term of this patent is extended or adjusted under 35 U.S.C. 154(b) by 352 days.

(21) Appl. No.: 12/390,636

(22) Filed: Feb. 23, 2009

(65) Prior Publication Data

US 2010/0214419 A1 Aug. 26, 2010

(51) Int. Cl.
*H04N 5/232* (2006.01)
*H04N 5/225* (2006.01)

(52) U.S. Cl.
USPC .............. 348/211.2; 348/211.5; 348/207.1

(58) Field of Classification Search
USPC .......... 348/211.1–211.14, 152, 153, 159, 169
See application file for complete search history.

(56) References Cited

U.S. PATENT DOCUMENTS

| | | | | |
|---|---|---|---|---|
| 6,037,970 | A * | 3/2000 | Kondo | 348/14.1 |
| 6,948,131 | B1 | 9/2005 | Neven et al. | |
| 7,663,703 | B2 * | 2/2010 | Kang | 348/731 |
| 2002/0003575 | A1 * | 1/2002 | Marchese | 348/231 |
| 2002/0171741 | A1 * | 11/2002 | Tonkin et al. | 348/211.3 |
| 2003/0184647 | A1 * | 10/2003 | Yonezawa et al. | 348/143 |
| 2004/0001149 | A1 * | 1/2004 | Smith | 348/218.1 |
| 2004/0075772 | A1 * | 4/2004 | Gu et al. | 348/571 |
| 2004/0107270 | A1 | 6/2004 | Stephens et al. | |
| 2005/0008240 | A1 * | 1/2005 | Banerji et al. | 382/238 |
| 2005/0185047 | A1 * | 8/2005 | Hii | 348/36 |
| 2005/0193421 | A1 | 9/2005 | Cragun | |
| 2005/0227218 | A1 | 10/2005 | Mehta et al. | |
| 2006/0023066 | A1 * | 2/2006 | Li et al. | 348/159 |
| 2006/0171603 | A1 | 8/2006 | Jung et al. | |
| 2006/0174203 | A1 * | 8/2006 | Jung et al. | 715/751 |

(Continued)

FOREIGN PATENT DOCUMENTS

WO WO2007082171 A2 7/2007

OTHER PUBLICATIONS

PCT Search Report dated Oct. 4, 2010 from corresponding PCT International Application No. PCT/US2010/023251 filed Feb. 4, 2010, 4 pages.

(Continued)

*Primary Examiner* — Kelly L Jerabek
(74) *Attorney, Agent, or Firm* — Pablo Tapia; Jim Ross; Micky Minhas

(57) ABSTRACT

Video sharing is described. In an embodiment, mobile video capture devices such as mobile telephones capture video streams of the same event. A video sharing system obtains contextual information about the video streams and uses that to form a video output from the streams, that output being for sharing by other entities. For example, the formed video provides an enhanced viewing experience as compared with an individual one of the input video streams. In embodiments the contextual information may be obtained from content analysis of the video streams, from stored context information and from control information such as device characteristics. In some embodiments the video streams of a live event are received and the output video formed in real time. In examples feedback is provided to video capture devices to suggest that the zoom, viewing position or other characteristics are adjusted or to achieve this automatically.

20 Claims, 8 Drawing Sheets

(56) References Cited

U.S. PATENT DOCUMENTS

| | | | | |
|---|---|---|---|---|
| 2007/0263076 | A1* | 11/2007 | Andrews et al. | 348/14.08 |
| 2008/0112315 | A1* | 5/2008 | Hu et al. | 370/230 |
| 2008/0143875 | A1* | 6/2008 | Scott et al. | 348/512 |
| 2008/0209330 | A1 | 8/2008 | Cruver | |
| 2008/0216125 | A1 | 9/2008 | Li et al. | |
| 2008/0275881 | A1 | 11/2008 | Conn et al. | |
| 2009/0051778 | A1* | 2/2009 | Pan | 348/218.1 |
| 2009/0066789 | A1* | 3/2009 | Baum et al. | 348/143 |
| 2010/0180297 | A1* | 7/2010 | Levine et al. | 725/38 |

OTHER PUBLICATIONS

Bouthemy, et al., "Video Hyper-links Creation for Content-Based Browsing and Navigation", in Proc. Workshop on Content-Based Multimedia Indexing, CBMI 1999, 8 pages.

Deng, et al., "Unsupervised Segmentation of Color-Texture Regions in Images and Video", IEEE Transactions on Pattern Analysis and Machine, 2001, 27 pages.

Engstrom, et al., "Mobile Collaborative Live Video Production", retrieved on Feb. 10, 2009 at <<http://www.tii.se/mobility/Files/Mobile%20Multimedia_ME20080505.pdf>>, 4 pages.

"Kaltura and Wikimedia Enable Collaborative Video Creation", retrieved on Feb. 12, 2009 at <<http://collaborationblog.typepad.com/collaboration/2008/01/kaltura-and-wik.html>>, The Culture of Collaboration, Jan. 23, 2008, 2 pages.

Mahindroo, et al., "Enhanced Video Representation using Objects", 2002 Proc. of the Indian Conference on Computer Vision, Graphics and Image Processing, 6 pages.

Szeliski, "Image Alignment and Stitching: A Tutorial", Foundations and Trends in Computer Graphics and Vision, vol. 2, No. 1 (2006) pp. 1-104.

* cited by examiner

US 8,767,081 B2

SHARING VIDEO DATA ASSOCIATED WITH THE SAME EVENT

BACKGROUND

Video sharing web services are known which enable end users to upload videos captured using their mobile telephones to a web site. The videos may then be viewed by others who access the web site. An end user is able to specify whether his or her video is to be publicly available to all visitors to the web site or whether it is to be shared only by a specified group of individuals.

Such video sharing web services are used for many purposes such as sharing videos of family events between family members who live in different countries. Other examples include sharing videos of educational lectures or entertainment performances. Typically video is captured on a mobile phone and at a later time is uploaded to the web service. Others are then able to download the video from the web service.

Typically the videos recorded by mobile phones have low resolution and poor quality for a variety of reasons. For example, the mobile phone may shake unintentionally during video capture as the end user is typically not expert at video capture. Also the position of the video capture device with respect to the scene being recorded and the lighting conditions and other environmental conditions may be badly selected. In addition, the communications link between the mobile capture device and the web site may be poor during the upload process and this can further reduce the quality of the video.

In addition, when several users have captured video of the same event the resulting videos at the web site are difficult to select between. It is then a time consuming and complex process for individuals to view each of those videos before being able to decide which provides the best result. If an individual is to download each of those videos from the web service before selecting the most appropriate one for his or her purpose download link capacity is used. Also, storage capacity is taken up at the web service and bandwidth is used to upload all the videos to the web service.

The embodiments described herein are not limited to implementations which solve any or all of the disadvantages of known video sharing systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Video sharing is described. In an embodiment, mobile video capture devices such as mobile telephones capture video streams of the same event. A video sharing system obtains contextual information about the video streams and uses that to form a video output from the streams, that output being for sharing by other entities. For example, the formed video provides an enhanced viewing experience as compared with an individual one of the input video streams. In embodiments the contextual information may be obtained from content analysis of the video streams, from stored context information and from control information such as device characteristics. In some embodiments the video streams of a live event are received and the output video formed in real time. In examples feedback is provided to video capture devices to suggest that the zoom, viewing position or other characteristics are adjusted or to achieve this automatically.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
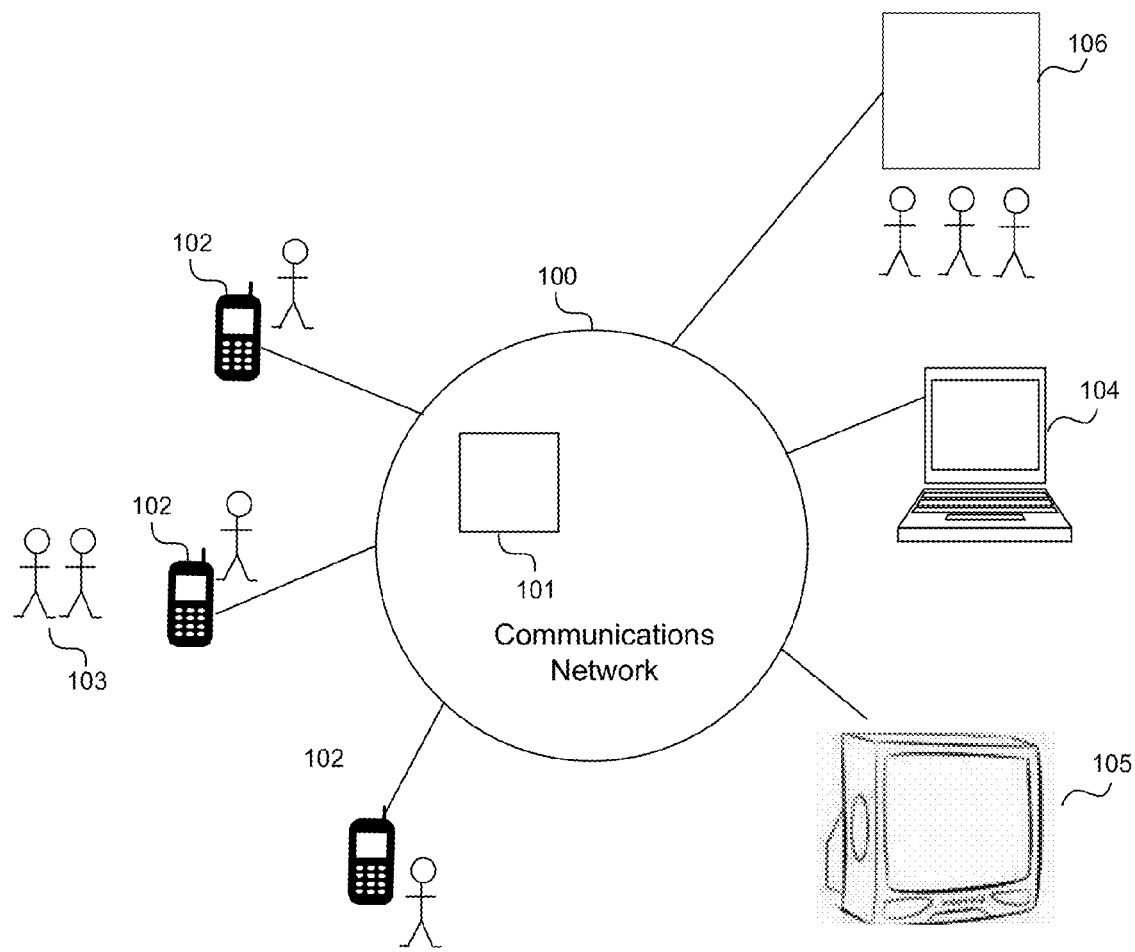
FIG. 1 is a schematic diagram of a video sharing system used in a communications network.

FIG. 1 is a schematic diagram of a video sharing system 101 used in a communications network 100. The communications network is of any suitable type such as the Internet, a local area network, a wide area network, a wireless communications network, or any network suitable for communicating streaming video between entities. Streaming users 102 comprise video capture devices which may or may not be mobile. For example, these video capture devices may be mobile telephones, PDAs, laptop computers or any other suitable type of video capture device which is portable or static and which is able to capture and send streaming video to the communications network 100 either directly or via other entities. In the example illustrated the video capture devices 102 are all shown as mobile telephones capturing video of the same scene 103 which may be a wedding for example. Many more video capture devices may be present and these may be capturing video of other scenes or events.

The video sharing system comprises infrastructure illustrated for clarity in FIG. 1 as a single communications network node 101. However, it is not essential to use a single network node 101 as the functionality may be distributed over a plurality of entities in the communications network 100. The communications network node has functionality to receive streaming video and control information from the video capture devices 102 and to enable other entities 104, 105, 106 in the communications network to share the streamed video in an enhanced manner. Contextual information is used by the video sharing system to add value to the received video streams in a variety of possible ways. In an embodiment other family members who are not physically present at the wedding 103 may view the video provided by the video sharing system 101 at a large display screen 106 in communication with the video sharing system. Other types of entity may share the video such as personal computers 104, mobile telephones 105, or other entities with capability to receive and display video from the video sharing system 101.

Figure 2:
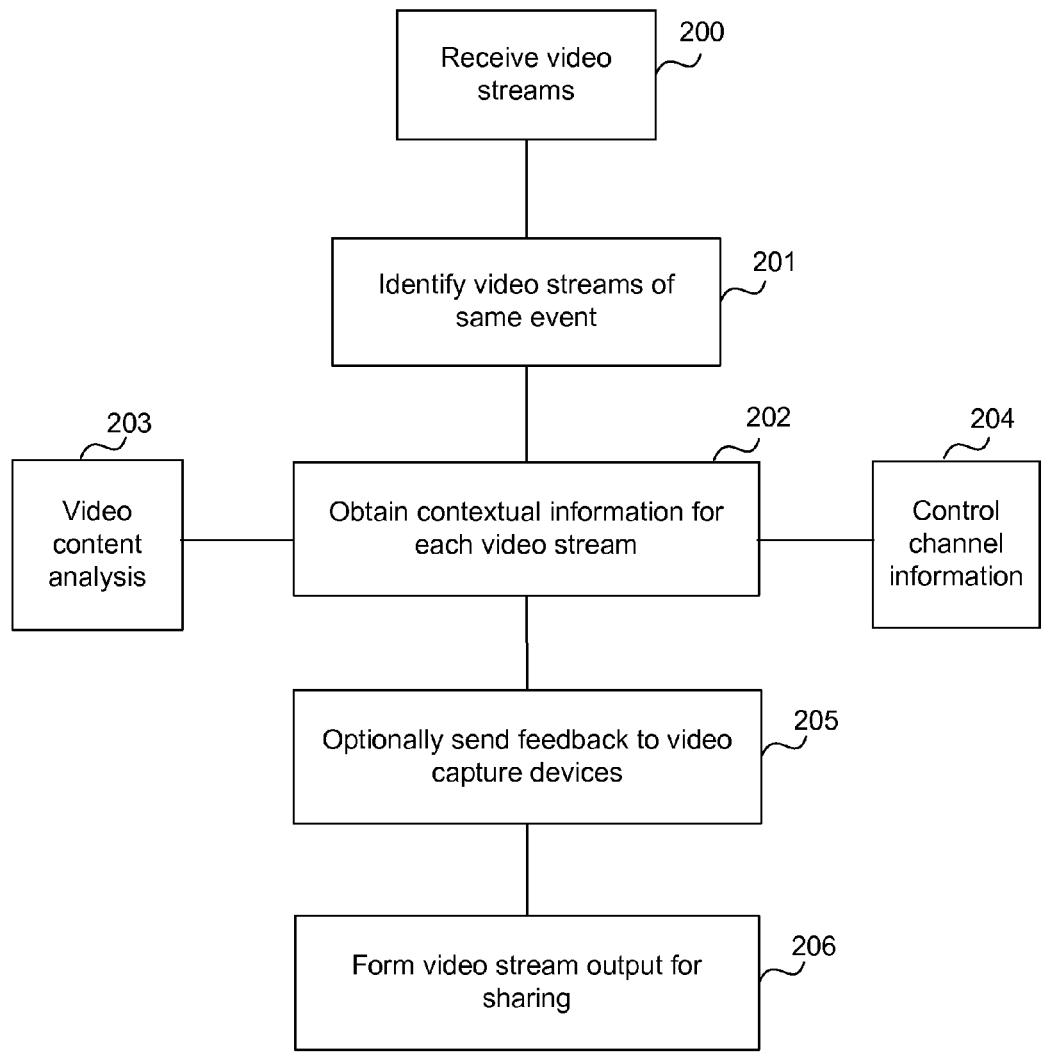
FIG. 2 is a flow diagram of a method at a video sharing system.

FIG. 2 is a flow diagram of a method at a video sharing system (such as 101 of FIG. 1). A plurality of video streams are received 200 from video capture devices and the video sharing system identifies 201 those video streams which are of the same event. This identification is achieved in any suitable manner. For example, communication between each video capture device and the video sharing system 101 may be achieved using a pair of communications channels, one for communicating the video stream content and one for communicating control information. In some embodiments the control information channel is used to send an identifier of the event to the video sharing system which is used to select video streams of the same event. For example, a web service is provided by the video sharing system 101 which enables users to specify a code or channel identity for a particular event. All streaming users who capture video streams of the particular event have access to the web service and are able to select the appropriate channel identity. In this way the video sharing system is able to receive huge numbers of video streams and to quickly and simply identify those streams which are records of the same event. In other embodiments, the content of the video stream itself is analyzed in order to identify those streams which are records of the same event. Also, channel identity information may be sent together with the video content in some cases.

In some embodiments an audio stream is received together with the video stream where the video capture device also has audio capture capability. However, this is not essential.

The video sharing system 101 obtains 202 contextual information for each video stream of the same event. For example, this contextual information may comprise information received 204 from a control channel between the video capture device and the video sharing system. Alternatively or as well, the contextual information may be obtained from analysis 203 of the video stream content (and/or from any associated audio stream content). It is also possible for the contextual information to be obtained from historical records of past video streaming behavior and/or from video capture device records accessible to the video sharing system.

A non-exhaustive list of examples of contextual information is: video quality, steadiness/shakiness of video, audio quality, physical location information obtained over the control channel such as GPS information, cellular network location information, viewing angle estimate, object recognition results, video stream overlap estimates; communication link conditions, available bandwidth, packet loss, delay, jitter; also the current state of the video capture device battery which may indicate the amount of processing that can be done on that device; capability of the video capture device such as maximum possible resolution, minimum lux for illumination, zooming capacity (optical and digital).

Using the contextual information together with rules, thresholds or other criteria the video sharing system is optionally arranged to send 205 feedback to the video capture devices. This feedback may be user feedback that is presented to a user of the video capture device at a graphical user interface (or other interface) on that device. For example, the feedback may suggest that the user move the position of the video capture device in a particular manner to improve the view of the scene being captured. In another example, the feedback may suggest that the user change the zoom of the video capture device or alter the resolution or other capability of the video capture device. In another example the feedback may suggest that the user stabilize the camera or change motion of the camera. In other examples the feedback may indicate the location and capability of other video capture devices capturing the same event and make suggestions as to whether the current video capture device should continue capture or not. It is also possible for the feedback to be transparent to the end user in that it may simply be received by the video capture device and acted upon automatically by that device without user input. For example, the feedback may instruct the video capture device not to send redundant information such as a common view between the user and another user. This reduces video processing power and saves bandwidth.

The video sharing system is also arranged to form 206 a video output for sharing by other entities in the communications network. The process of forming the video output takes into account the contextual information in order that value is added and the video to be shared provides an enhanced viewing experience as compared with viewing only an individual one of the received video streams. The video output is formed from the received video streams of the same event, for example, so as to enable the view point to be changed, to stitch together video streams to increase the field of view, to add links to related documents or materials, to improve quality, to improve security or for other video sharing enhancement reasons. The video output may be formed offline and stored at a location in the communications network accessible to the video sharing system. It is also possible for the video output to be formed dynamically as requested by entities requiring the shared video. In some embodiments the video streams are of a live event which is shared in a live process by other entities. In this case the processes at the video sharing system are carried out in real time.

Figure 3:
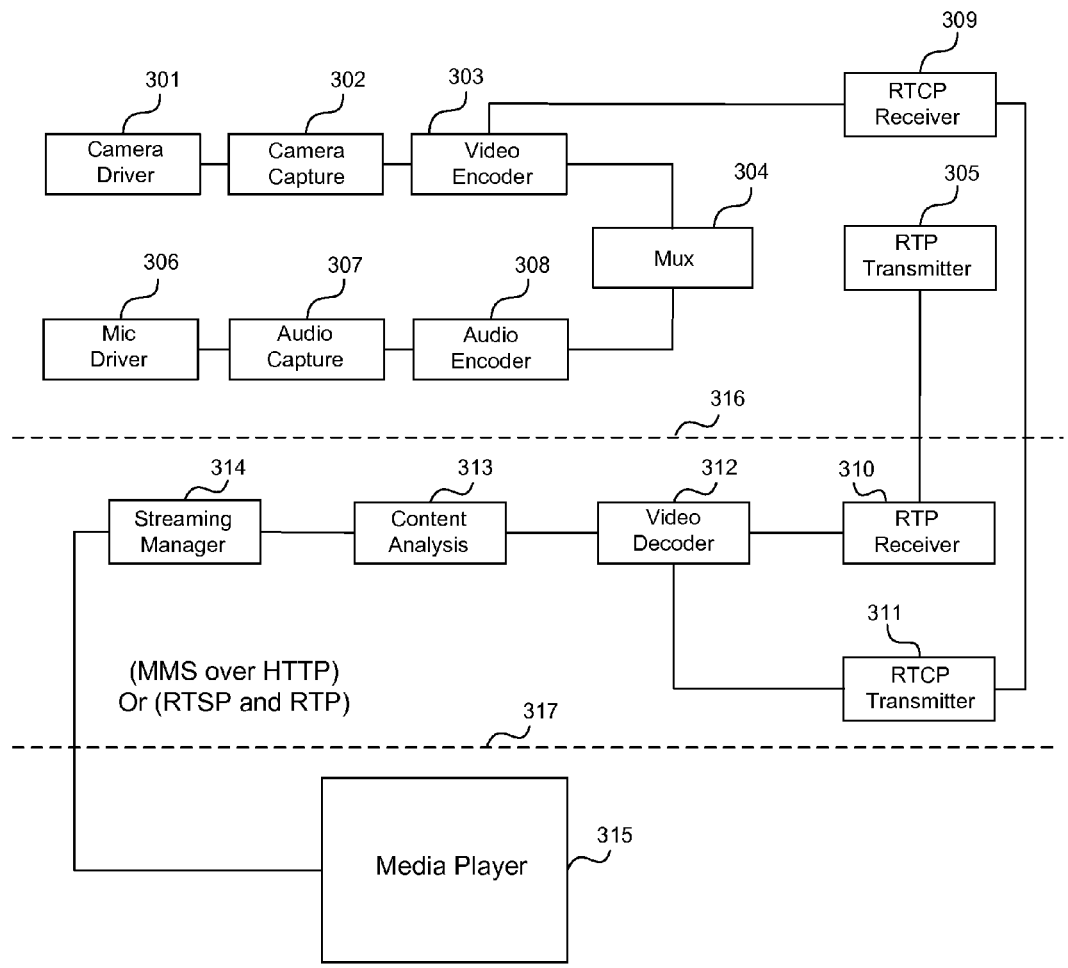
FIG. 3 is a flow diagram of another method at a video sharing system.

FIG. 3 is a flow diagram of an example video sharing method. The parts of the flow diagram above dotted line 316 represent processes which occur at the video capture device. The parts of the flow diagram below dotted line 316 and above dotted line 317 represent processes which occur at the video sharing system (such as 101 of FIG. 1). The parts of the flow diagram below dotted line 317 represent processes which occur at an entity which receives the shared video.

A camera driver 301 at the video capture device carries out a capture process 302 to capture a video stream. The video stream is encoded using a video encoded 303 of any suitable type as known in the art. In embodiments where the video capture device also comprises audio capture capability a microphone driver 306 is provided. This captures 307 an audio stream which is encoded 308 as known in the art. The video and audio streams are multiplexed 304 and transmitted over a real time protocol (RTP) communications link, using RTP transmitter 305, to the video sharing system (101 of FIG. 1). RTP is defined by the Internet Engineering Task Force in RFC 3550 and other RFCs. However, it is not essential to use an RTP communications link. Any suitable communications protocol may be used to send the content from the video capture device to the video sharing system. A separate communications session between the video capture device and the video sharing system may be established in order to communicate control information. For example, this separate communications session may be established using session initiation protocol (SIP) or any other suitable protocol. In the example illustrated in FIG. 3 RTCP (real-time transport control protocol) is used together with an RTCP transmitter 311 and RTCP receiver 309.

At the video sharing system the content received on the RTP session is demultiplexed and the video content is decoded using video decoder 312. The audio content may also be decoded using an audio decoder. The video content and optionally the audio content is processed by a content analysis engine 313 which is described in more detail below. The content analysis engine 313 also comprises functionality to form the output video stream and a streaming manager 314 converts the steam into the appropriate format for provisioning to the entities which require to share the video. The video output stream is sent to the destination entities using any suitable communications protocol such as MMS (Microsoft® media server), Windows® media HTTP (hyper text transfer) streaming protocol or RTSP (real time streaming protocol) and RTP. At the destination entity the video is displayed using any suitable display engine such as a media player 315.

Figure 4:
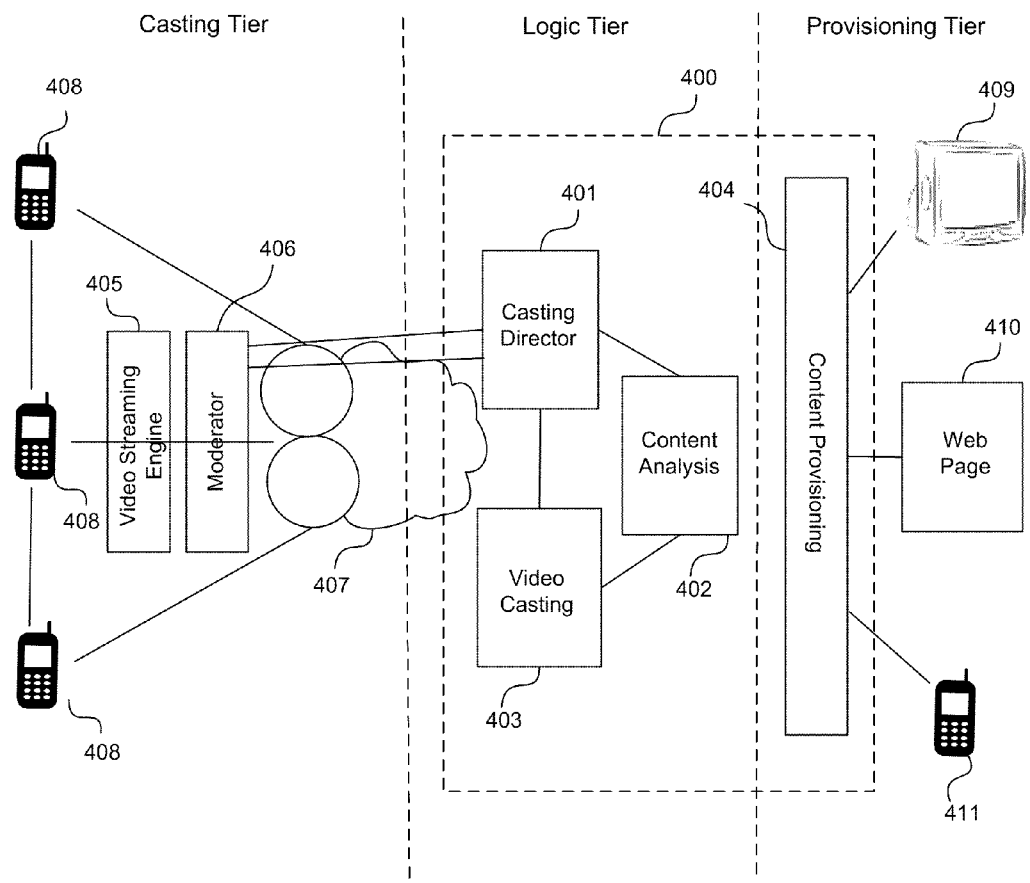
FIG. 4 is a schematic diagram of a video sharing system.

FIG. 4 is a schematic diagram of a video sharing apparatus 400 which may be provided at the communications network node 101 of FIG. 1. The apparatus 400 comprises a casting director 401, a video casting engine 403, a content analysis engine 402, and a content provisioning engine 404. These engines may be integral and provided using a single communications network node or may be distributed over a plurality of servers or other processors in a communications network.

The video sharing apparatus 400 receives input from a video streaming engine 405 provided in each video capture device 408 as well as from a moderator 406 also provided in each video capture device. The input is sent over a communications network 407. FIG. 4 also illustrates example video sharing devices which receive video shared by the apparatus 400. These include a television 409, a web page 410 viewed using a suitable web browser and equipment, and a mobile telephone 411.

As mentioned above, each video capture device 408 comprises a video streaming engine 405 and a moderator 406. Together these form a casting tier as indicated in FIG. 4. The video streaming engine 405 is arranged to stream video captured by the device upstream to the video sharing apparatus 400. The moderator 406 is arranged to send control information to the casting director 401 of the video sharing apparatus 400. This control information may be sent periodically and/or on demand and may comprise information on the device capabilities and usage, such as camera resolution, CPU utilization, bandwidth availability and so on. The moderator 406 may also be arranged to execute commands received from the casting director 401.

More detail about the video sharing apparatus 400 is now given. The video casting engine 403 receives video streams from the video capture devices 408 and readies those video streams for content analysis. The video casting engine may also be arranged to forward control information to the casting director 401. For example, this control information may comprise communications network statistics such as packet loss and delay which are available to the video casting engine as a result of its receipt of the video streams.

The content analysis engine 402 is arranged to analyze the content received from the video capture devices which may comprise video and/or audio content. This analysis may be carried out in real time or may be carried out offline. More detail about the content analysis engine 402 is given below with reference to FIG. 5.

The casting director 401 receives input from moderators 406 as well as receiving control information from the video casting engine 403 and receiving information from the content analysis engine 402. The casting director 401 is arranged to assign roles to video capture devices 408 on the basis of information available to it as well as to pre-specified rules, thresholds or other criteria. It is arranged to send commands to moderators at the video capture devices 408 to implement the roles and is also able to send user feedback to the video capture devices 408.

In an embodiment the casting director 401 is arranged to assign roles to the video capture devices 408 on the basis of information about capabilities of those video capture devices (which may be received from the moderators or may be available at the video sharing apparatus 400 as the result of a registration process) and using information about a target viewing experience (which may be pre-specified or provided by user input at a web service provided by the video sharing apparatus). In an example, the target viewing experience is to obtain a wider field of view of the event. In another example, the target viewing experience is to select an optimum viewing angle for an event. The roles that are assigned might be for example, to stream video alone, to stream video and audio, to stream audio alone, to stop streaming any content until a specified time.

In some embodiments the casting director 401 is provided on a server at which the video sharing system 400 is implemented. In other embodiments the casting director is wholly or partially distributed amongst the video capture devices 408. More detail of an embodiment where the casting director is partially distributed amongst the video capture devices is given below.

The video sharing apparatus 400 comprises a content provisioning engine 404 which is responsible for sending video feeds that are cast from the video capture devices 408 to target entities. The provisioning engine 404 is arranged to transform the video feeds to formats appropriate to the type of destination entity. For example, the target entity may be a television 409, a computer displaying the video at a web browser 410, or a mobile telephone 411.

The content provisioning engine 404 may also be arranged to provide a web service for enabling end users to create a channel (or event identifier) that streaming users are able to cast to and which target entities are able to view. The web service may also provide the ability for users to register and store user details, video capture device details, target device details, and the like. In addition, users may be provided with options to make channels for video sharing public or private where private channels allow only a specified group of users to cast to and/or view. The web service also enables users to specify a target viewing experience associated with a particular channel. For example, this may be to obtain the widest field of view or it may be to select an optimal viewing angle.

Figure 5:
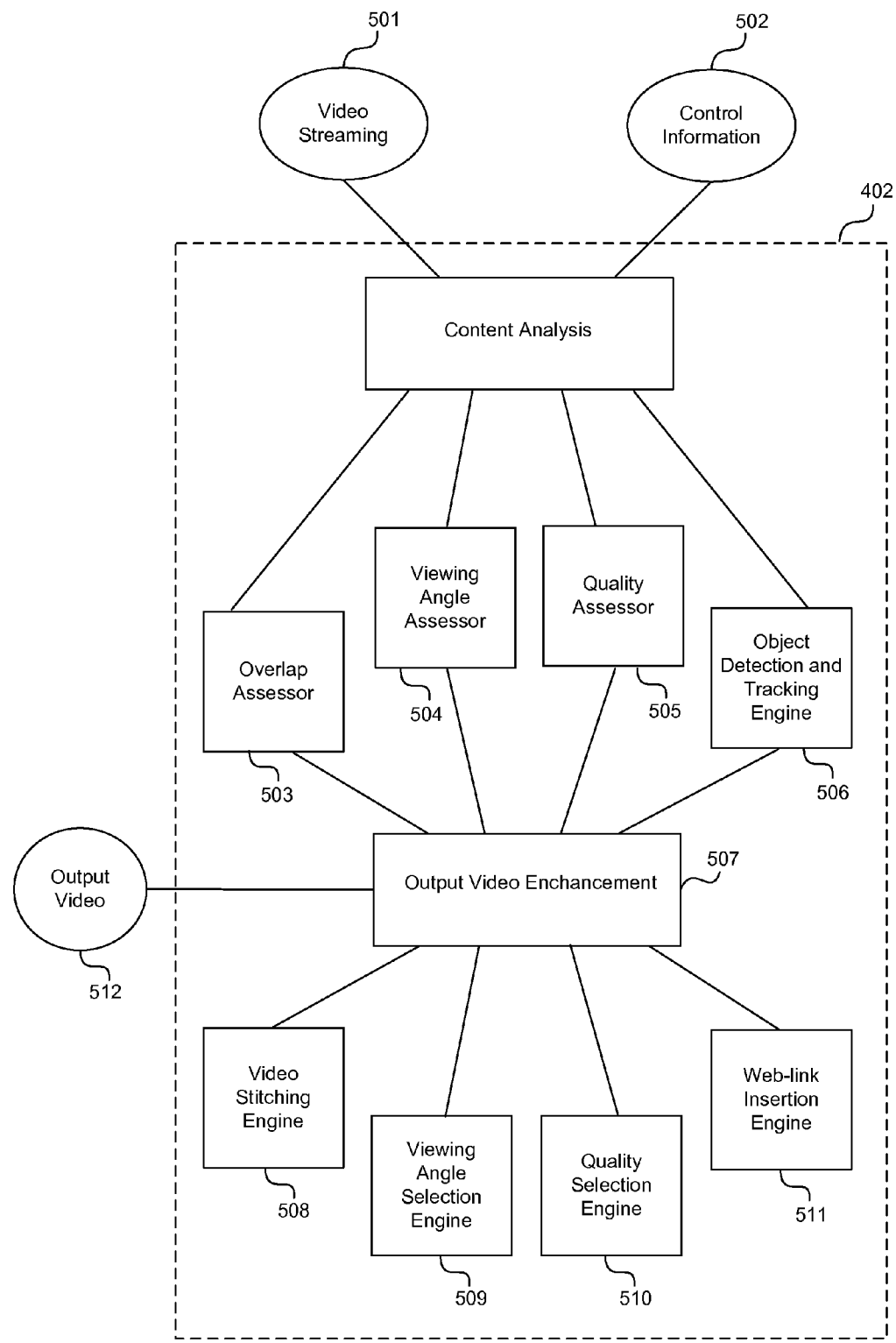
FIG. 5 is a schematic diagram of the content analysis component of FIG. 4 in more detail.

FIG. 5 is a schematic diagram of a content analysis engine 402. This engine receives as input video streams 501 and control information 502 as described above with reference to FIG. 4. It provides output video 512 which is formed from the input video streams 501 together with contextual information comprising the control information 502 and the results of content analysis carried out by the content analysis engine itself.

The content analysis engine comprises various components or modules for making different types of analysis of the content. Examples of these are illustrated as modules 503-506 in FIG. 5 although these are merely examples. Different combinations and other types of such module may be used. An overlap assessor 503 may be provided which assesses the degree or amount of overlap between any pair of video streams. Results from this assessor 503 may be used by a video stitching engine 508 provided in the content analysis engine. Any suitable method of overlap assessment and video stitching may be used. For example, image alignment processes and stitching algorithms are described in detail in "Image Alignment and Stitching: A tutorial" by Richard Szeliski 2006, published in Foundations and Trends in Computer Graphics and Vision Vol. 2, No 1 (2006) 1-104 which is incorporated herein by reference in its entirety. The overlap assessor 503 and video stitching engine 508 may be integral.

A viewing angle assessor 504 may be provided which assesses the relative viewing angles of video capture devices capturing the same event. Any suitable method of assessing the relative viewing angle may be used. A quality assessor 505 may be provided which assesses the relatively quality of video streams from different video capture devices capturing the same event. Any suitable method of assessing video quality may be used. An object detection and tracking engine 506 may be provided which automatically extracts objects (or potentially just regions) from video sequences. The objects are sets of 2D image regions across multiple frames which correspond to real, physical objects. Any suitable such object detection and tracking engine may be used such as that described in, "Unsupervised Segmentation of Color-Texture Regions in Images and Video," Y Deng, B S Manjunath—IEEE Transactions on Pattern Analysis and Machine, 2001, which is incorporated herein by reference in its entirety. By using such an automated process to extract objects from a video, value can be added to the video in many ways. For example, by adding the capability of searching the video content by objects and/or by adding hyperlinks to objects in the video.

An output video enhancement module takes the input video streams 501 together with the contextual information and any specified rules, thresholds or criteria relating to the target viewing experience. These are used to form the output video 512. Various engines are provided to form the output video and these may be integral with one another but are shown separately in FIG. 5 for clarity. For example, these engines comprise a video stitching engine 508, a viewing angle selection engine 509 a quality selection engine 510, and a web-link insertion engine. The web-link insertion engine may take results from the object detection and tracking engine and use those to insert hyper-links into the video output 512. These may be hyper-links to documents, files, other videos, other resources which are related to the video content as determined by the results of the object detection and tracking engine. For example, these hyper-links may enable navigation in a video database as described in "Video hyper-links creation for content-based browsing and navigation" Bouthemy et al. 1999 in Proc. Workshop on Content-Based Multimedia Indexing, CBMI'99 which is incorporated herein by reference in its entirety.

Figure 6:
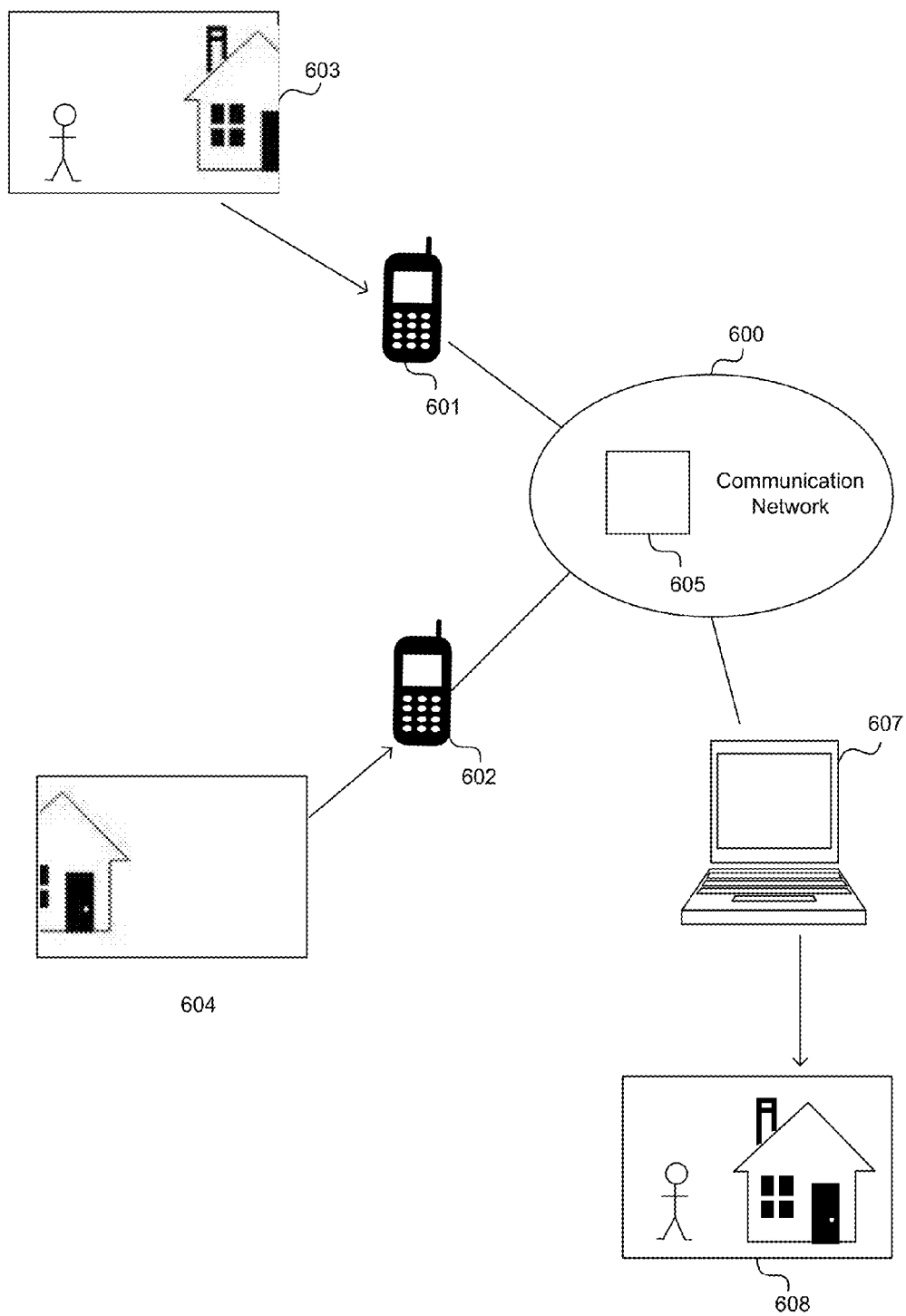
FIG. 6 is a schematic diagram of use of a video sharing system with video stitching.

FIG. 6 is a schematic diagram illustrating use of the video stitching engine 508. Streaming users have video capture devices 601, 602 as described above and use these to capture video of the same scene but from different view points. The field of view of a first one of the video capture devices is illustrated at 603 in FIG. 6 and the field of view of a second one of the video capture devices is illustrated at 604 in FIG. 6. There is some overlap between the fields of view as illustrated. The video streams are sent upstream to a video sharing system 605 as described above and stitched together to form an output video with a wider field of view of the event than either of the single video streams achieve alone. The output video may be viewed at a PC 607 or other entity and representation 608 indicates the resulting video display.

Figure 7:
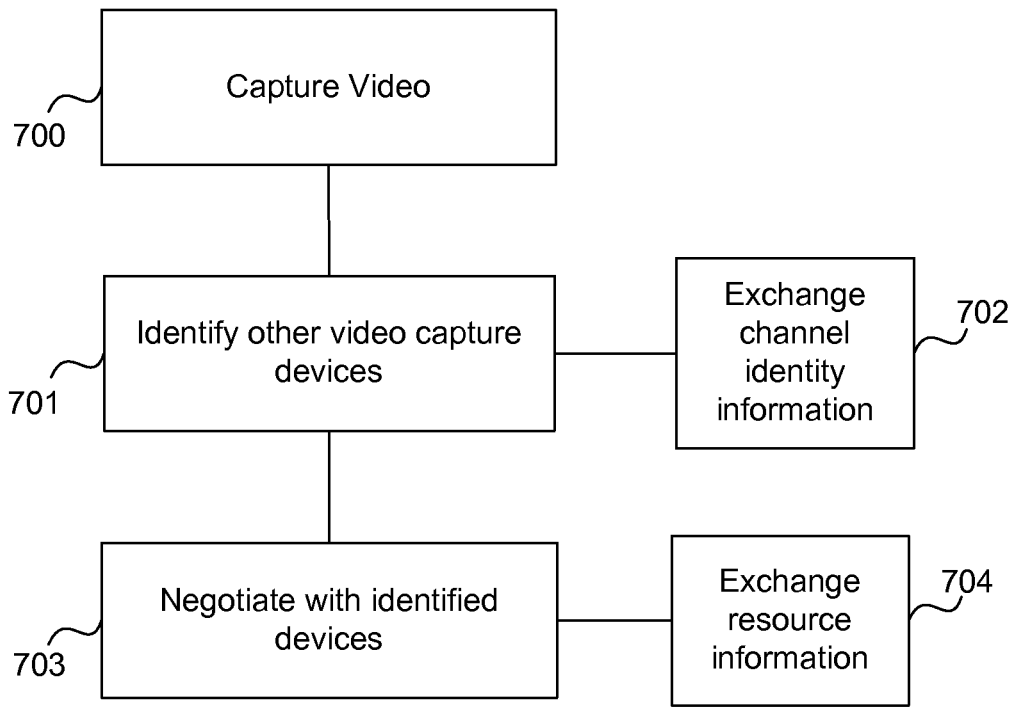
FIG. 7 is a flow diagram of a method at a video capture device.

In some embodiments functionality of the casting director is at least partially distributed amongst the video capture devices. For example, each video casting device may be arranged to carry out a method as now described with reference to FIG. 7. Video of an event is optionally captured 700 and the device proceeds to identify 701 other video capture devices which are capturing or going to capture video of the same event. For example, this identification process may comprise probing the video sharing system to request the information. In other embodiments, the identification is carried out using a local wireless discovery process probing for other wireless communications devices in the physical vicinity. Once other wireless communication devices are discovered information may be exchanged 702 with these about the video sharing channel for the event. In this way the video capture device is able to identify other video capture devices which are capturing video of the same event. It is not essential for the event to be in only one physical location. For example, the event may be a shared event between different geographical locations and in this case the video capture devices involved will all be using the same channel identity which may be obtained from the video sharing system.

Once those other devices are identified, the device proceeds to automatically negotiate with the identified devices to determine how and/or whether to proceed with video capture. The negotiation process may involve exchange of information about resources at the devices, bandwidth availability, and the like and may proceed according to suitable rules specified at the devices.

Figure 8:
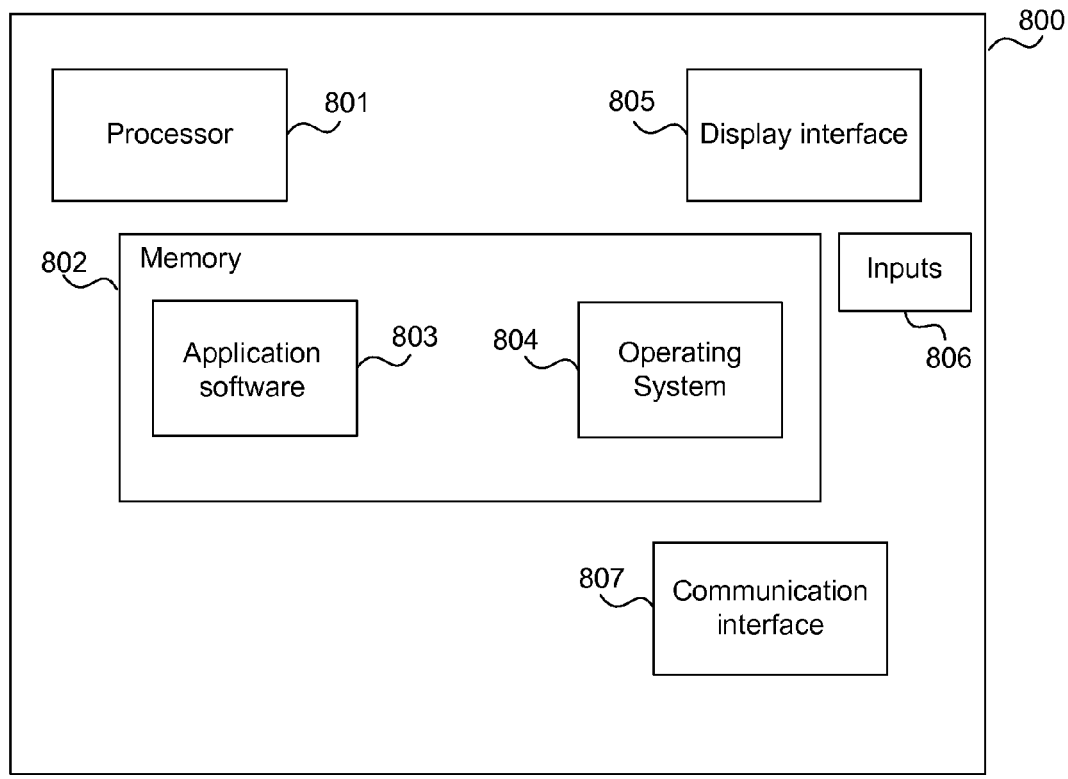
FIG. 8 illustrates an exemplary computing-based device in which embodiments of a video sharing system may be implemented.

FIG. 8 illustrates various components of an exemplary computing-based device 800 which may be implemented as any form of a computing and/or electronic device, and in which embodiments of a video sharing system may be implemented.

The computing-based device 800 comprises one or more inputs 806 which are of any suitable type for receiving media content, Internet Protocol (IP) input, video streams, audio streams or other input. The device also comprises communication interface 807 to enable it to communicate over a communications network with mobile video capture devices, mobile telephones, and other communications entities.

Computing-based device 800 also comprises one or more processors 801 which may be microprocessors, controllers or any other suitable type of processors for processing computing executable instructions to control the operation of the device in order to provide a video sharing system. Platform software comprising an operating system 804 or any other suitable platform software may be provided at the computing-based device to enable application software 803 to be executed on the device.

The computer executable instructions may be provided using any computer-readable media, such as memory 802. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output 805 is also provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method comprising:
receiving, at a node in a web sharing service, a plurality of video streams from a plurality of respective video capture devices accessing the web sharing service, each video stream originating from a different one of the plurality of video capture devices and the plurality of video capture devices capturing at least two different events;
obtaining contextual information about the plurality of video streams;
identifying a subset of the plurality of video streams recording a same event of the at least two different events based on an analysis of the contextual information, each video stream in the subset of the plurality of video streams including video content captured at the same event;
examining first capabilities of a first device recording a first video stream of the subset and second capabilities of a second device recording a second video stream of the subset;
sending, based on the examining, first instructions to the first device to send only audio information;
sending, based on the examining, second instructions to the second device to send only video information;
forming a single video stream output from the subset of the plurality of video streams based at least in part on the contextual information; and
sharing the single video stream output via the web sharing service.

2. A method as claimed in claim 1, wherein obtaining the contextual information comprises analyzing the video content of each video stream in the plurality of video streams.

3. A method as claimed in claim 2, wherein the process of analyzing the video content comprises determining parameters related to a viewing angle of each of the video capture devices.

4. A method as claimed in claim 3, wherein the process of analyzing the video content also comprises assessing a quality of the video content.

5. A method as claimed in claim 3, further comprising, if the parameters related to the viewing angle of two of the plurality of video capture devices are similar, then sending a message to one of the two video capture devices to stop an associated video stream.

6. A method as claimed in claim 1, wherein the single video stream output provides an improved view of the same event as compared with a view of the same event from only one of the video streams in the subset of the plurality of video streams.

7. A method as claimed in claim 1, wherein the same event includes a live event and wherein the method is carried out in real time.

8. A method as claimed in claim 1, further comprising sending control commands to one or more of the plurality of video capture devices based at least in part on the contextual information.

9. A method as claimed in claim 1, further comprising sending feedback to a first video capture device based at least in part on contextual information from a video stream provided by a second video capture device.

10. A method as claimed in claim 9, wherein the feedback comprises recommended changes to a zoom feature of the first video capture device.

11. A method as claimed in claim 9, wherein the feedback comprises a recommendation to change a position of the first video capture device.

12. A method as claimed in claim 1, wherein providing the single video stream output comprises stitching at least part of two or more of the subset of the plurality of video streams together.

13. A method as claimed in claim 1, further comprising receiving a channel identifier for each video stream and wherein the subset of the plurality of video streams including video content recorded at the same event has a same channel identifier.

14. A computer-implemented method comprising:
- receiving, at a node in a web sharing service, a plurality of video streams capturing multiple different events from a first group of users of the web sharing service, each video stream originating from a different one of a plurality of mobile user video capture devices;
- obtaining contextual information about the plurality of video streams;
- identifying at least two video streams as capturing a same event based at least in part on an analysis of the contextual information;
- examining first capabilities of a first device recording a first video stream of the at least two video streams and second capabilities of a second device recording a second video stream of the at least two video streams;
- sending, based on the examining, first instructions to the first device to send only audio information;
- forming a video stream output from the at least two identified video streams based at least in part on the context information obtained from the at least two identified video streams; and
- sharing, via the web sharing service, the video stream output with a second group of users of the web sharing service.

15. A method as claimed in claim 14, wherein the at least two identified video streams are of a live event and wherein the video stream output is shared in real time.

16. A method as claimed in claim 14, further comprising sending feedback to one or more mobile user video capture devices based at least in part on the analysis of the contextual information.

17. A method as claimed in claim 14, wherein the web sharing service provides an ability for the first group of users to specify the second group of users as target viewers such that users of the web sharing service that are not part of the second group of users cannot view the video stream output through the web sharing service.

18. A method as claimed in claim 14, wherein the contextual information includes one of physical location information or cellular network location information.

19. A method at a mobile video capture device in a communications network comprising:
- capturing a video stream of an event;
- employing a local wireless discovery process to identify one or more other mobile video capture devices which are also capturing one or more respective video streams of the event;
- determining one or more types of information to send as part of the video stream, determining including:
  - exchanging information with the one or more other mobile video capture devices to coordinate a video sharing channel associated with the event;
  - sharing capabilities of the mobile video capture device;
  - receiving instructions, to send either only audio information or only video information in the video stream of the event, the instructions being generated by examining the capabilities of the mobile video capture device and at least second capabilities of at least one of the one or more other mobile video capture devices; and
- sending, in accordance with the instructions, the video stream of the event to a web-based sharing service so that the video stream is available to share with a group of users not at the event through the web-based sharing service via the video sharing channel.

20. A method as claimed in claim 19, wherein the information includes resource information available at each of the mobile video capture devices.

* * * * *